(12) United States Patent
Ma et al.

(10) Patent No.: US 8,462,470 B2
(45) Date of Patent: Jun. 11, 2013

(54) AUTO POWER-OFF AND ACTUATION CIRCUIT FOR A FAN

(75) Inventors: Ching-Cheng Ma, Pingtung (TW); Ting-Cheng Lan, Pingtung (TW)

(73) Assignee: ADDA Corp., Pingtung (TW)

( * ) Notice: Subject to any disclaimer, the term of this patent is extended or adjusted under 35 U.S.C. 154(b) by 433 days.

(21) Appl. No.: 12/851,692

(22) Filed: Aug. 6, 2010

(65) Prior Publication Data

US 2012/0034065 A1    Feb. 9, 2012

(51) Int. Cl.
*H02H 7/09*    (2006.01)
(52) U.S. Cl.
USPC .............. 361/33; 361/23; 361/30; 323/266; 323/265; 318/400.21; 318/400.09; 318/811
(58) Field of Classification Search
USPC ......... 361/23, 33, 30; 323/266, 265; 318/811, 318/400.09, 400.21
See application file for complete search history.

(56) References Cited

U.S. PATENT DOCUMENTS

| | | | | |
|---|---|---|---|---|
| 4,562,386 A * | 12/1985 | Goff et al. | ............... | 318/400.04 |
| 4,591,767 A * | 5/1986 | Koide | ............ | 388/813 |
| 5,444,595 A * | 8/1995 | Ishikawa et al. | ................ | 361/86 |
| 5,642,027 A * | 6/1997 | Windes et al. | ................ | 320/166 |
| 6,545,442 B2 * | 4/2003 | Sunaga et al. | ................ | 318/727 |
| 6,810,202 B2 * | 10/2004 | Hsu et al. | ...................... | 388/800 |
| 7,773,352 B2 * | 8/2010 | Mishima | ......................... | 361/30 |
| 7,885,044 B2 * | 2/2011 | Mishima | ......................... | 361/30 |
| 8,270,138 B2 * | 9/2012 | Takahashi et al. | ............ | 361/101 |

FOREIGN PATENT DOCUMENTS

TW    540902    7/2003

* cited by examiner

*Primary Examiner* — Rita Leykin
(74) *Attorney, Agent, or Firm* — Jackson IPG PLLC

(57) ABSTRACT

An automatic power-off and actuation circuit for a fan comprises a drive unit, a detection unit, a voltage-modulating unit, a comparison unit, an auto-restart unit, a regulation unit and a controlled IC, wherein the detection unit is electrically connected to the drive unit, the voltage-modulating unit is electrically connected to the detection unit, the comparison unit is electrically connected to the voltage-modulating unit, the auto-restart unit is electrically connected to the comparison unit, the regulation unit is electrically connected to the auto-restart unit and the drive unit, and the controlled IC is electrically connected to the regulation unit and the drive unit.

9 Claims, 2 Drawing Sheets

AUTO POWER-OFF AND ACTUATION CIRCUIT FOR A FAN

FIELD OF THE INVENTION

The present invention is generally relating to a fan circuit, more particularly to a fan circuit that is capable of providing auto power-off and actuation functions.

BACKGROUND OF THE INVENTION

A conventional fan generally comprises a current-limitation circuit used to protect circuit from over current. When a fan current of the fan increases and reaches to a predetermined level, the current-limitation circuit limits the fan current and enables the fan current to stop rising. Therefore, when the fan is locked and incapable of operating normally, maximum consumption power can be limited within an allowable range to avoid long-term over current to lead destruction of electronic devices. However, when the fan encounters an external force (such as locked fan blade or dust accumulation) and is not completely locked therefore producing higher current level, in the mean time, the current-limitation circuit is not activated yet so that electronic devices might be destructed by higher current level.

To improve mentioned disadvantage, with reference to R.O.C. patent publication No. 540902, this invention utilizes a two-stage current limiter to prevent a high pulse current from passing through coil windings under abnormal operation. However, the fan current is a ripple current and peak value of the ripple current is 1.5 times the average value. If trigger point of the current-limitation circuit is lower than peak value of the ripple current, the normal operating fan current probably increases to peak value of the ripple current instantaneously thereby activating the current-limitation circuit in error. Consequently, designer generally designs trigger point of the current-limitation circuit higher than 1.5 times the average value of the ripple current. But, before activation of the current-limitation circuit, the fan still sustains long-term over current to lead destruction of electronic devices.

SUMMARY

A primary object of the present invention is to provide an auto power-off and actuation circuit for a fan which drives the fan and comprises a drive unit, a detection unit, a voltage-modulating unit, a comparison unit, an auto-restart unit, a regulation unit and a controlled IC, wherein the detection unit is electrically connected to the drive unit, the voltage-modulating unit is electrically connected to the detection unit, the comparison unit is electrically connected to the voltage-modulating unit, the auto-restart unit is electrically connected to the comparison unit, the regulation unit is electrically connected to the auto-restart unit and the drive unit, and the controlled IC is electrically connected to the regulation unit and the drive unit. This invention obtains an induced voltage via the detection unit, the induced voltage is being sent to the voltage-modulating unit to provide a modulated voltage, where the corresponding modulated voltage compares with the comparison unit so as to determine whether output of the comparison unit provides a high voltage or a low voltage, if a high voltage is provided, the auto-restart unit and the regulation unit are activated to enable the controlled IC to stop operation so that an auto power-off function is achieved. Besides, once the fan is not completely locked, via design of the voltage-modulating unit and the comparison unit, this invention enables to reach current limitation thereby preventing destruction of electronic devices from higher consumption power. Eventually, when a failure is eliminated, the fan is capable of operating normally.

DETAILED DESCRIPTION OF THE INVENTION

Figure 1:
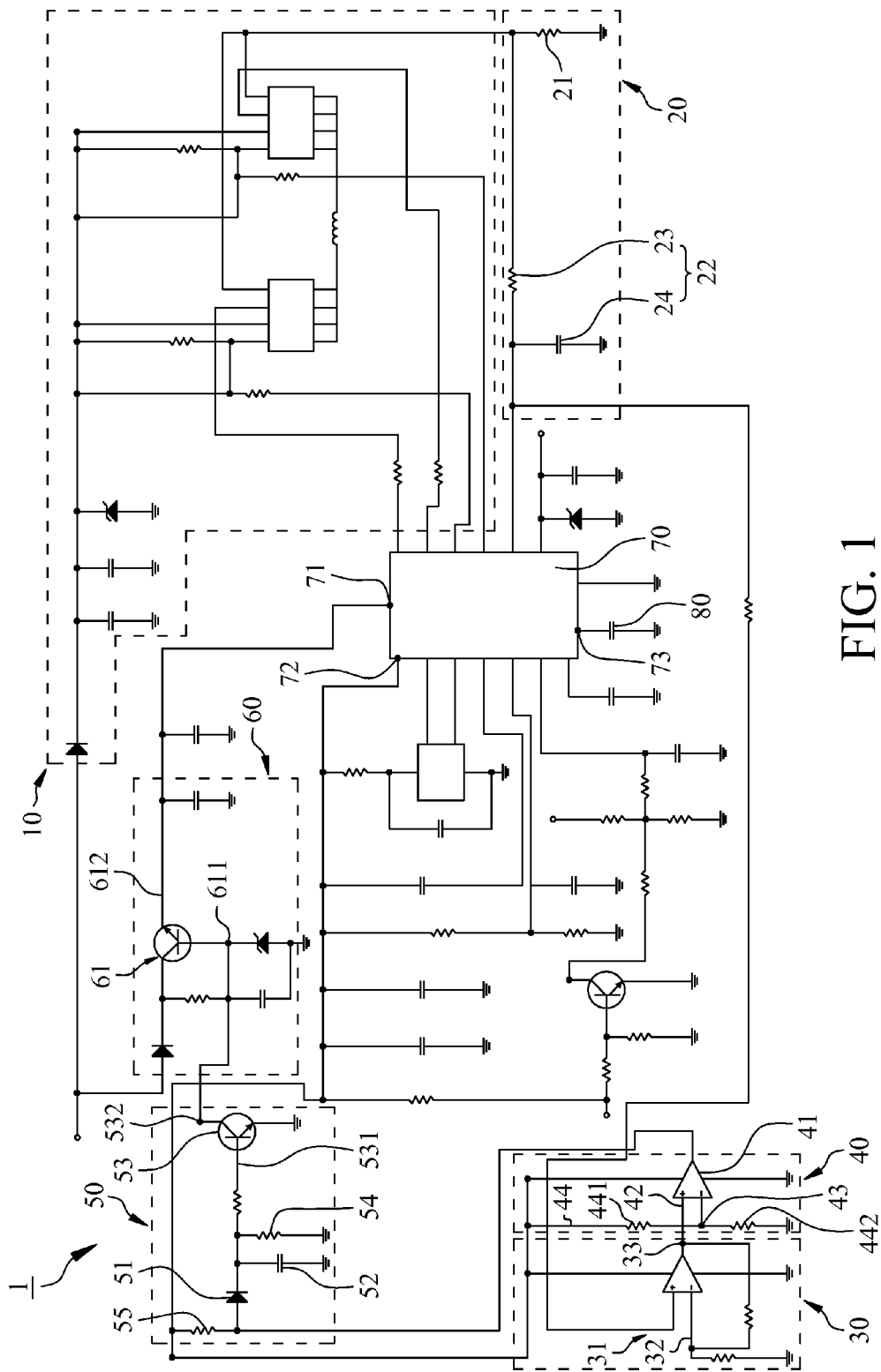
FIG. 1 is an auto power-off and actuation circuit for a fan in accordance with a first embodiment of the present invention.

Referring to FIG. 1, an auto power-off and actuation circuit for a fan 1 in accordance with a first embodiment of the present invention comprises a drive unit 10, a detection unit 20, a voltage-modulating unit 30, a comparison unit 40, an auto-restart unit 50, a regulation unit 60 and a controlled IC 70, wherein the detection unit 20 is electrically connected to the drive unit 10, the voltage-modulating unit 30 is electrically connected to the detection unit 20, the comparison unit 40 is electrically connected to the voltage-modulating unit 30, the auto-restart unit 50 is electrically connected to the comparison unit 40, the regulation unit 60 is electrically connected to the auto-restart unit 50 and the drive unit 10, and the controlled IC 70 is electrically connected to the regulation unit 60 and the drive unit 10.

Figure 2:
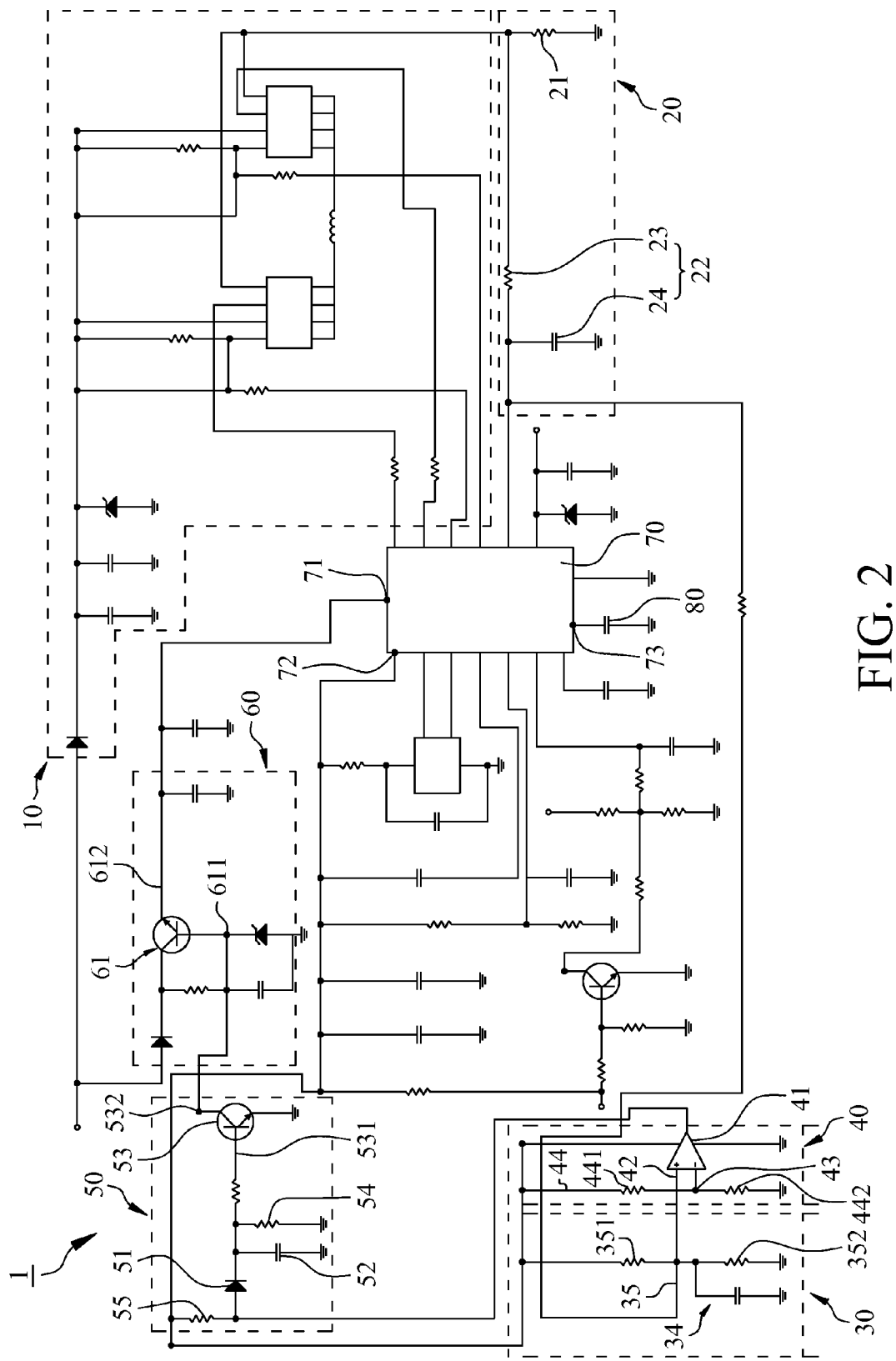
FIG. 2 is the auto power-off and actuation circuit for a fan in accordance with a second embodiment of the present invention.

Referring to FIG. 1, the drive unit 10 is capable of driving a fan to operate, the detection unit 20 comprises a detection resistor 21 and a wave filter 22, wherein the detection resistor 21 means for obtaining an induced voltage from the drive unit 10, and the induced voltage is in direct proportion to operate current of the fan. In this embodiment, the wave filter 22 is electrically connected to the drive unit 10 and has a first resistor 23 and a first capacitor 24 connected to the first resistor 23. The wave filter means for filtering unnecessary ripple of the induced voltage. In this embodiment, the voltage-modulating unit 30 is an amplifying unit 31 and the amplifying unit 31 means for amplifying the induced voltage, preferably, the amplifying unit 31 could be a non-inverting amplifier 32. With reference to FIG. 2, the auto power-off and actuation circuit for a fan 1 in accordance with a second embodiment of the present invention, in this embodiment, the voltage-modulating unit 30 is a voltage-level adjusting unit 34, preferably, the voltage-level adjusting unit 34 could be a first voltage divider 35. The first voltage divider 35 comprises a second resistor 351 and a third resistor 352, wherein the third resistor 352 is electrically connected to the comparison unit 40. With reference to FIG. 1, in this embodiment, the comparison unit 40 could be a comparator 41, the comparator 41 comprises a positive terminal 42, a negative terminal 43 and a second voltage divider 44 connected to the negative terminal 43, preferably, the second voltage divider 44 comprises a fourth resistor 441 and a fifth resistor 442 connected to the negative terminal 43. The voltage-modulating unit 30 has an output terminal 33, and the positive terminal 42 is electrically connected to the output terminal 33. The voltage level of the negative terminal 43 is equal to the voltage level of the fifth resistor 442. When the voltage level of the positive terminal 42 is higher than the voltage level of the negative terminal 43, the comparison unit 40 provides a high voltage, on the contrary, when the voltage level of the positive terminal 42 is lower than the voltage level of the negative terminal 43, the comparison unit 40 provides a low voltage. The auto-restart unit 50 includes a diode 51, a second capacitor 52, a first transistor 53, a sixth resistor 54 and a seventh resistor 55, wherein the first transistor 53 comprises a base terminal 531, the second capacitor 52 is electrically connected to the base terminal 531 of the first transistor 53 and the sixth resistor 54, preferably, cathode of the diode 51 is electrically connected to the second capacitor 52, the base terminal 531 of the first transistor 53 and the sixth resistor 54. Besides, anode of the diode 51 is electrically connected to the seventh resistor 55. In this embodiment, the auto-restart unit 50 means for controlling on/off operation of the regulation unit 60. The regulation unit 60 comprises a second transistor 61, the first transistor 53 is electrically connected to the second transistor 61, wherein the first transistor 53 further comprises a collector terminal 532, the second transistor 61 has a base terminal 611, and the collector terminal 532 of the first transistor 53 is electrically connected to the base terminal 611 of the second transistor 61. Activation/stop operation of the controlled IC 70 is determined by the second transistor 61. In this embodiment, the controlled IC 70 comprises a power terminal 71, a voltage-regulating terminal 72 and a protection terminal 73, the regulation unit 60 is electrically connected to the power terminal 71, besides, the second transistor 61 further comprises an emitter terminal 612, and the emitter terminal 612 is electrically connected to the power terminal 71. The voltage-regulating terminal 72 is electrically connected to the voltage-modulating unit 30, the comparison unit 40 and the auto-restart unit 50. The auto power-off and actuation circuit for a fan 1 further comprises a third capacitor 80 and the protection terminal 73 is electrically connected to the third capacitor 80. When the controlled IC 70 stops operation to shut down the fan caused by external force, the third capacitor 80 determines lock protection time for the fan.

Referring to FIG. 1, when the fan encounters external force and locks, operating current of the drive unit 10 would increase rapidly. The induced voltage of the detection unit 20 obtained by the drive unit 10 also increases with increased operating current of the drive unit 10 and thereafter the induced voltage has been amplified via the non-inverting amplifier 32 thereby sending the amplified induced voltage to the positive terminal 42 of the comparison unit 40. With reference to FIG. 2, in another embodiment, the induced voltage has been sent to the first voltage divider 35 and divided by the third resistor 352 of the first voltage divider 35 thereby sending the divided induced voltage to the comparison unit 40. With reference to FIG. 1, when the voltage level of the positive terminal 42 continues to rise and exceeds the voltage level of the negative terminal 43, the comparison unit 40 provides the high voltage. Meanwhile, the diode 51 of the auto-restart unit 50 is in conduction and enables the second capacitor 52 to start charging. Besides, the first transistor 53 is activated followed conduction of the diode 51 thereby enabling the second transistor 61 of the regulation unit 60 to close to lead the controlled IC 70 to stop operation. Eventually, the fan stops operating thereby providing auto power-off function. Thereafter, with reference to FIG. 1, the voltage being sampled by the detection unit 20 is a low level voltage. At this time, the voltage level of the positive terminal 42 is lower than that of the negative terminal 43 thereby providing the low voltage, and the low voltage enables the diode 51 of the auto-restart unit 50 to cut-off The second capacitor 52 discharges to the sixth resistor 54 and the first transistor 53, in this embodiment, discharging time of the second capacitor 52 is higher than that of the third capacitor 80. When discharging voltage level of the second capacitor 52 is lower than conductive voltage level of the first transistor 53, the first transistor 53 is cut-off and enables the second transistor 61 of the regulation unit 60 and the controlled IC 70 to restore conduction thereby executing trigger action to reactivate the controlled IC 70. Eventually, the auto actuation function can be achieved to make the fan to operate normally. By design of the voltage-modulating unit 30 and the comparison unit 40, when the fan is not completely locked, this invention is capable of achieving current limitation thereby preventing destruction of electronic devices from higher consumption power. Besides, when a failure is eliminated, the fan is capable of operating normally.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. An automatic power-off and actuation circuit for a fan comprising:
    a drive unit;
    a detection unit, the detection unit is electrically connected to the drive unit;
    a voltage-modulating unit, the voltage-modulating unit is electrically connected to the detection unit;
    a comparison unit, the comparison unit is electrically connected to the voltage-modulating unit;
    an auto-restart unit, the auto-restart unit is electrically connected to the comparison unit;
    a regulation unit, the regulation unit is electrically connected to the auto-restart unit and the drive unit; and
    a controlled IC, the controlled IC is electrically connected to the regulation unit and the drive unit,
        wherein the auto-restart unit comprises a first transistor, the regulation unit comprises a second transistor, and the second transistor is electrically connected to the first transistor.

2. The automatic power-off and actuation circuit for a fan in accordance with claim 1, wherein the voltage-modulating unit is an amplifying unit.

3. The automatic power-off and actuation circuit for a fan in accordance with claim 2, wherein the amplifying unit could be a non-inverting amplifier.

4. The automatic power-off and actuation circuit for a fan in accordance with claim 1, wherein the voltage-modulating unit is a voltage-level adjusting unit.

5. The automatic power-off and actuation circuit for a fan in accordance with claim 4, wherein the voltage-level adjusting unit could be a first voltage divider.

6. The automatic power-off and actuation circuit for a fan in accordance with claim 1, wherein the comparison unit could be a comparator.

7. The automatic power-off and actuation circuit for a fan in accordance with claim 6, wherein comparator comprises a positive terminal, the voltage-modulating unit has an output terminal, and the positive terminal is electrically connected to the output terminal.

8. The automatic power-off and actuation circuit for a fan in accordance with claim 1, wherein the controlled IC comprises a voltage-regulating terminal that is electrically connected to the voltage-modulating unit, the comparison unit and the auto-restart unit.

9. The automatic power-off and actuation circuit for a fan in accordance with claim 1, wherein the auto-restart unit further comprises a second capacitor, a sixth resistor, a diode and a seventh resistor, wherein anode of the diode is electrically connected to the seventh resistor, and cathode of the diode is electrically connected to the second capacitor, the first transistor and the sixth resistor.

\* \* \* \* \*